(12) United States Patent
Nozaki et al.

(10) Patent No.: US 6,504,947 B1
(45) Date of Patent: Jan. 7, 2003

(54) METHOD AND APPARATUS FOR MULTI-LEVEL ROUNDING AND PATTERN INSPECTION

(75) Inventors: Takeo Nozaki, Tokyo (JP); Satoshi Nishii, Yokohama (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/291,944

(22) Filed: Apr. 15, 1999

(30) Foreign Application Priority Data

Apr. 17, 1998 (JP) .......................................... 10-107523

(51) Int. Cl.$^7$ ................................................. G06K 9/80
(52) U.S. Cl. ......................... 382/148; 382/144; 382/149
(58) Field of Search ................................ 382/144, 145, 382/148, 149, 256, 275; 250/559.2, 559.34, 559.36, 559.39, 559.4, 559.45; 348/87, 126; 356/390, 394, 237.4, 237.5; 702/40, 159

(56) References Cited

U.S. PATENT DOCUMENTS

| | | | |
|---|---|---|---|
| 4,628,531 A | * 12/1986 | Okamoto et al. | ............... 382/8 |
| 4,962,541 A | * 10/1990 | Doi et al. | ...................... 382/30 |
| 5,475,766 A | * 12/1995 | Tsuchiya et al. | |
| 6,091,845 A | * 7/2000 | Pierrat et al. | ............... 382/144 |

FOREIGN PATENT DOCUMENTS

JP          6-273915          9/1994

OTHER PUBLICATIONS

Mitsuo Tabata et al., A new die–to–database mask inspection system with i–line optics for 256 Mbit and 1Gbit DRAMs, Proceedings of the SPIE, vol. 3096, pp. 415–422, Apr. 1997.*

* cited by examiner

*Primary Examiner*—Brian Werner
(74) *Attorney, Agent, or Firm*—Whitham, Curtis & Christofferson, PC

(57) ABSTRACT

A method and an apparatus are presented for correcting corner images of an integrated circuit pattern, for example, in an real image produced by optical scanning and deleting defects from the corner sections. Design data describing rectangular or trapezoidal patterns are expanded in a design data expansion section in multi-level gradations to produce a reference data for each pixel having resolution capability less than the inspection resolution capability. In a reference image forming section, based on the edge position of the real image, the reference data are processed to produce a reference image by rounding off the corner section and the line width while maintaining multi-level gradations. The boundary regions are blended using optical point spread functions obtained from the real image.

7 Claims, 12 Drawing Sheets

1 PIXEL = 16 SUB-PIXELS
8 X 12 = 96 GRADATIONS

Fig. 4
| 0 | 0 | 0 | 0 | 0 | 0 | 0 |
|---|---|---|---|---|---|---|
| 128 | 128 | 128 | 128 | 96 | 0 | 0 |
| 255 | 255 | 255 | 255 | 192 | 0 | 0 |
| 255 | 255 | 255 | 255 | 192 | 0 | 0 |
| 255 | 255 | 255 | 255 | 192 | 0 | 0 |
| 255 | 255 | 255 | 255 | 192 | 0 | 0 |
| 255 | 255 | 255 | 255 | 192 | 0 | 0 |
Fig. 5
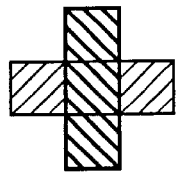
Fig. 6
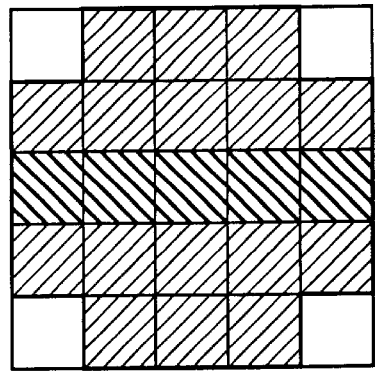
Fig. 7
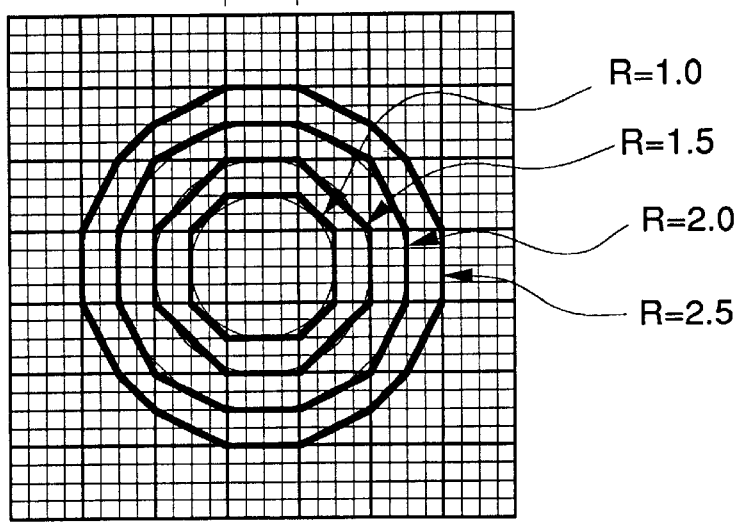

↑
FOLDING LINE

↑
FOLDING LINE

| | 0250 | | 0252 | | 0254 | | 0256 | | 0258 | | 0260 | | 0262 | | 0264 | | 0266 | | 0268 | |
|---|---|---|---|---|---|---|---|---|---|---|---|---|---|---|---|---|---|---|---|---|
| 0269 | 0 | 0 | 0 | 0 | 0 | 0 | 11 | 36 | 87 | 168 | 233 | 254 | 255 | 255 | 255 | 255 | 255 | 255 | 255 | 255 |
| 0270 | 0 | 0 | 0 | 0 | 0 | 0 | 10 | 36 | 89 | 171 | 235 | 255 | 255 | 255 | 255 | 255 | 255 | 255 | 255 | 255 |
| 0271 | 0 | 0 | 0 | 0 | 0 | 0 | 10 | 38 | 90 | 173 | 238 | 255 | 255 | 255 | 255 | 255 | 255 | 255 | 255 | 255 |
| 0272 | 0 | 0 | 0 | 0 | 0 | 0 | 11 | 39 | 91 | 176 | 238 | 253 | 255 | 255 | 255 | 255 | 255 | 255 | 255 | 255 |
| 0273 | 0 | 0 | 0 | 0 | 0 | 0 | 12 | 37 | 86 | 171 | 234 | 251 | 255 | 255 | 255 | 255 | 255 | 255 | 255 | 255 |
| 0274 | 0 | 0 | 0 | 0 | 0 | 0 | 9 | 32 | 78 | 161 | 228 | 250 | 255 | 255 | 255 | 255 | 255 | 255 | 255 | 255 |
| 0275 | 0 | 0 | 0 | 0 | 0 | 0 | 6 | 26 | 68 | 146 | 216 | 244 | 253 | 255 | 255 | 255 | 255 | 255 | 255 | 255 |
| 0276 | 0 | 0 | 0 | 0 | 0 | 0 | 3 | 19 | 54 | 122 | 189 | 221 | 237 | 245 | 249 | 252 | 250 | 252 | 252 | 250 |
| 0277 | 0 | 0 | 0 | 0 | 0 | 0 | 1 | 9 | 34 | 90 | 148 | 178 | 195 | 206 | 216 | 223 | 222 | 224 | 225 | 220 |
| 0278 | 0 | 0 | 0 | 0 | 0 | 0 | 0 | 2 | 15 | 52 | 96 | 121 | 135 | 145 | 156 | 164 | 164 | 162 | 166 | 165 |
| 0279 | 0 | 0 | 0 | 0 | 0 | 0 | 0 | 1 | 4 | 19 | 44 | 62 | 73 | 83 | 93 | 99 | 97 | 92 | 98 | 102 |
| 0280 | 0 | 0 | 0 | 0 | 0 | 0 | 1 | 2 | 1 | 3 | 11 | 19 | 26 | 33 | 39 | 42 | 39 | 36 | 40 | 45 |
| 0281 | 0 | 0 | 0 | 0 | 0 | 0 | 0 | 1 | 1 | 0 | 0 | 1 | 3 | 5 | 7 | 8 | 7 | 7 | 8 | 9 |
| 0282 | 0 | 0 | 0 | 0 | 0 | 0 | 0 | 0 | 0 | 0 | 0 | 0 | 0 | 0 | 0 | 0 | 0 | 0 | 0 | 0 |
| 0283 | 0 | 0 | 0 | 0 | 0 | 0 | 0 | 0 | 0 | 0 | 0 | 0 | 0 | 0 | 0 | 0 | 0 | 0 | 0 | 0 |
| 0284 | 0 | 0 | 0 | 0 | 0 | 0 | 0 | 0 | 0 | 0 | 0 | 0 | 0 | 0 | 0 | 0 | 0 | 0 | 0 | 0 |
| 0285 | 0 | 0 | 0 | 0 | 0 | 0 | 0 | 0 | 0 | 0 | 0 | 0 | 0 | 0 | 0 | 0 | 0 | 0 | 0 | 0 |
| 0286 | 0 | 0 | 0 | 0 | 0 | 0 | 0 | 0 | 0 | 0 | 0 | 0 | 0 | 0 | 0 | 0 | 0 | 0 | 0 | 0 |
| 0287 | 0 | 0 | 0 | 0 | 0 | 0 | 0 | 0 | 0 | 0 | 0 | 0 | 0 | 0 | 0 | 0 | 0 | 0 | 0 | 0 |
| 0288 | 0 | 0 | 0 | 0 | 0 | 0 | 0 | 0 | 0 | 0 | 0 | 0 | 0 | 0 | 0 | 0 | 0 | 0 | 0 | 0 |

Fig. 16

| | 0250 | 0251 | 0252 | 0253 | 0254 | 0255 | 0256 | 0257 | 0258 | 0259 | 0260 | 0261 | 0262 | 0263 | 0264 | 0265 | 0266 | 0267 | 0268 |
|---|---|---|---|---|---|---|---|---|---|---|---|---|---|---|---|---|---|---|---|
| 0269 | 0 | 0 | 0 | 0 | 0 | 0 | 0 | 15 | 86 | 170 | 243 | 254 | 255 | 255 | 255 | 255 | 255 | 255 | 255 |
| 0270 | 0 | 0 | 0 | 0 | 0 | 0 | 0 | 15 | 86 | 170 | 243 | 254 | 255 | 255 | 255 | 255 | 255 | 255 | 255 |
| 0271 | 0 | 0 | 0 | 0 | 0 | 0 | 0 | 15 | 86 | 170 | 243 | 254 | 255 | 255 | 255 | 255 | 255 | 255 | 255 |
| 0272 | 0 | 0 | 0 | 0 | 0 | 0 | 0 | 15 | 85 | 169 | 242 | 254 | 255 | 255 | 255 | 255 | 255 | 255 | 255 |
| 0273 | 0 | 0 | 0 | 0 | 0 | 0 | 0 | 15 | 82 | 165 | 240 | 254 | 255 | 255 | 255 | 255 | 255 | 255 | 255 |
| 0274 | 0 | 0 | 0 | 0 | 0 | 0 | 0 | 14 | 75 | 157 | 233 | 250 | 255 | 255 | 255 | 255 | 255 | 255 | 255 |
| 0275 | 0 | 0 | 0 | 0 | 0 | 0 | 0 | 11 | 62 | 139 | 216 | 227 | 245 | 251 | 253 | 254 | 254 | 254 | 254 |
| 0276 | 0 | 0 | 0 | 0 | 0 | 0 | 0 | 6 | 44 | 110 | 180 | 178 | 204 | 215 | 220 | 221 | 222 | 222 | 222 |
| 0277 | 0 | 0 | 0 | 0 | 0 | 0 | 0 | 1 | 24 | 73 | 131 | 117 | 140 | 152 | 158 | 160 | 161 | 161 | 161 |
| 0278 | 0 | 0 | 0 | 0 | 0 | 0 | 0 | 0 | 6 | 36 | 78 | 55 | 74 | 84 | 89 | 90 | 91 | 91 | 91 |
| 0279 | 0 | 0 | 0 | 0 | 0 | 0 | 0 | 0 | 0 | 8 | 30 | 12 | 22 | 27 | 30 | 31 | 31 | 31 | 31 |
| 0280 | 0 | 0 | 0 | 0 | 0 | 0 | 0 | 0 | 0 | 0 | 3 | 0 | 0 | 0 | 0 | 0 | 0 | 0 | 0 |
| 0281 | 0 | 0 | 0 | 0 | 0 | 0 | 0 | 0 | 0 | 0 | 0 | 0 | 0 | 0 | 0 | 0 | 0 | 0 | 0 |
| 0282 | 0 | 0 | 0 | 0 | 0 | 0 | 0 | 0 | 0 | 0 | 0 | 0 | 0 | 0 | 0 | 0 | 0 | 0 | 0 |
| 0283 | 0 | 0 | 0 | 0 | 0 | 0 | 0 | 0 | 0 | 0 | 0 | 0 | 0 | 0 | 0 | 0 | 0 | 0 | 0 |
| 0284 | 0 | 0 | 0 | 0 | 0 | 0 | 0 | 0 | 0 | 0 | 0 | 0 | 0 | 0 | 0 | 0 | 0 | 0 | 0 |
| 0285 | 0 | 0 | 0 | 0 | 0 | 0 | 0 | 0 | 0 | 0 | 0 | 0 | 0 | 0 | 0 | 0 | 0 | 0 | 0 |
| 0286 | 0 | 0 | 0 | 0 | 0 | 0 | 0 | 0 | 0 | 0 | 0 | 0 | 0 | 0 | 0 | 0 | 0 | 0 | 0 |
| 0287 | 0 | 0 | 0 | 0 | 0 | 0 | 0 | 0 | 0 | 0 | 0 | 0 | 0 | 0 | 0 | 0 | 0 | 0 | 0 |
| 0288 | 0 | 0 | 0 | 0 | 0 | 0 | 0 | 0 | 0 | 0 | 0 | 0 | 0 | 0 | 0 | 0 | 0 | 0 | 0 |

Fig. 17

| | 0269 | 0270 | 0271 | 0272 | 0273 | 0274 | 0275 | 0276 | 0277 | 0278 | 0279 | 0280 | 0281 | 0282 | 0283 | 0284 | 0285 | 0286 | 0287 | 0288 |
|---|---|---|---|---|---|---|---|---|---|---|---|---|---|---|---|---|---|---|---|---|
| 0269 | 0 | 0 | 0 | 0 | 0 | 0 | 0 | 0 | 0 | 0 | 4 | 0 | 3 | 6 | 8 | 7 | 0 | 0 | 0 | 0 |
| 0268 | 0 | 0 | 0 | 0 | 0 | 0 | 0 | 0 | 0 | 0 | 2 | 2 | 4 | 9 | 11 | 8 | 0 | 0 | 0 | 0 |
| 0267 | 0 | 0 | 0 | 0 | 0 | 0 | 0 | 0 | 0 | 0 | 4 | 4 | 2 | 4 | 9 | 7 | 0 | 0 | 0 | 0 |
| 0266 | 0 | 0 | 0 | 0 | 0 | 0 | 0 | 0 | 0 | 0 | 6 | 9 | 7 | 1 | 6 | 5 | 0 | 0 | 0 | 0 |
| 0265 | 0 | 0 | 0 | 0 | 0 | 0 | 0 | 0 | 0 | 2 | 8 | 9 | 5 | 1 | 4 | 3 | 0 | 0 | 0 | 0 |
| 0264 | 1 | 1 | 1 | 0 | 0 | 1 | 1 | 1 | 3 | 4 | 6 | 6 | 1 | 4 | 7 | 7 | 1 | 0 | 0 | 0 |
| 0263 | 9 | 8 | 7 | 9 | 10 | 8 | 5 | 4 | 6 | 5 | 0 | 9 | 17 | 18 | 14 | 8 | 0 | 0 | 0 | 0 |
| 0262 | 10 | 8 | 6 | 4 | 2 | 1 | 3 | 7 | 6 | 4 | 7 | 12 | 17 | 16 | 11 | 3 | 0 | 0 | 0 | 0 |
| 0261 | 7 | 8 | 7 | 3 | 1 | 3 | 4 | 6 | 4 | 3 | 6 | 10 | 10 | 9 | 4 | 1 | 1 | 0 | 0 | 0 |
| 0260 | 22 | 20 | 19 | 20 | 21 | 21 | 23 | 24 | 22 | 18 | 15 | 13 | 8 | 2 | 1 | 2 | 1 | 0 | 0 | 0 |
| 0259 | 11 | 11 | 10 | 11 | 11 | 10 | 10 | 11 | 12 | 9 | 6 | 3 | 1 | 0 | 0 | 1 | 0 | 0 | 0 | 0 |
| 0258 | 0 | 0 | 0 | 0 | 0 | 0 | 0 | 0 | 0 | 0 | 0 | 0 | 0 | 0 | 0 | 0 | 0 | 0 | 0 | 0 |
| 0257 | 0 | 0 | 0 | 0 | 0 | 0 | 0 | 0 | 0 | 0 | 0 | 0 | 0 | 0 | 0 | 0 | 0 | 0 | 0 | 0 |
| 0256 | 0 | 0 | 0 | 0 | 0 | 0 | 0 | 0 | 0 | 0 | 0 | 0 | 0 | 0 | 0 | 0 | 0 | 0 | 0 | 0 |
| 0255 | 0 | 0 | 0 | 0 | 0 | 0 | 0 | 0 | 0 | 0 | 0 | 0 | 0 | 0 | 0 | 0 | 0 | 0 | 0 | 0 |
| 0254 | 0 | 0 | 0 | 0 | 0 | 0 | 0 | 0 | 0 | 0 | 0 | 0 | 0 | 0 | 0 | 0 | 0 | 0 | 0 | 0 |
| 0253 | 0 | 0 | 0 | 0 | 0 | 0 | 0 | 0 | 0 | 0 | 0 | 0 | 0 | 0 | 0 | 0 | 0 | 0 | 0 | 0 |
| 0252 | 0 | 0 | 0 | 0 | 0 | 0 | 0 | 0 | 0 | 0 | 0 | 0 | 0 | 0 | 0 | 0 | 0 | 0 | 0 | 0 |
| 0251 | 0 | 0 | 0 | 0 | 0 | 0 | 0 | 0 | 0 | 0 | 0 | 0 | 0 | 0 | 0 | 0 | 0 | 0 | 0 | 0 |
| 0250 | 0 | 0 | 0 | 0 | 0 | 0 | 0 | 0 | 0 | 0 | 0 | 0 | 0 | 0 | 0 | 0 | 0 | 0 | 0 | 0 |

Fig. 18

| MASKING PATTERN | MASKING PATTERN CURVATURE LOWER LIMIT | MASKING PATTERN CURVATURE UPPER LIMIT | 1-PIXEL GRADATION RATIO |
|---|---|---|---|
| FIGURE 5 | 1 x MAX | 4 x MAX | 1/3 |
| FIGURE 6 | 8 x MAX | 13 x MAX | 1/5 |
| FIGURE 7 R=1.0 | (MAX x 3)/4 | 2 x MAX+(MAX x 3)/4 | 1/2 |
| FIGURE 7 R=1.5 | MAX x 2 | MAX x 5 | 1/3 |
| FIGURE 7 R=2.0 | MAX x 4+MAX/2 | MAX x 8+ MAX/2 | 1/4 |
| FIGURE 7 R=2.5 (FIGURE8) | MAX x 7+MAX/4 | MAX x 12+ MAX/4 | 1/5 |
| FIGURE 9 | MAX x 5+MAX/4 | MAX x MAX/4 | 1/2 |
| FIGURE 10 | MAX x 2+MAX x 3/4 | MAX x 16+MAX x 3/4 | 1/14 |

METHOD AND APPARATUS FOR MULTI-LEVEL ROUNDING AND PATTERN INSPECTION

BACKGROUND OF THE INVENTION

1. Field of the Invention

The present invention relates in general to pattern inspection, and relates in particular to a method and apparatus for performing rounding correction of reference images used for Die-To-DataBASE inspection in terms of design data.

2. Description of the Related Art

In general, it is necessary to inspect the reproduction accuracy of fine patterns produced on such objects as integrated semiconductor circuits fabricated on photomasks, reticles, wafers and liquid crystal panels, in terms of the dimensions and shapes of ideal patterns produced from design data, using a pattern inspection apparatus built for this purpose.

This type of pattern inspection apparatus is required to first perform conversion of design data, coordinates of rectangular or trapezoidal shapes and line data described in stroke characters, into binary digital data comprised by [0]s and [1]s.

Next, an object pattern to be inspected is scanned with a laser beam, and using an image of the object pattern obtained either by transmitting light through the object pattern and focusing on a photodetector, or an optical imaging system, the characteristics of the edge profile of the object image are defined, and optical point-spread functions for the pattern are generated. The functions and binary bit data are convoluted to compute multi-level data (multi-valued data) which are used to produce a reference image.

Then, an actual image produced from optical scanning or imaging system and the reference image obtained from the design data are read synchronously into the apparatus to compare both images at the corresponding pixel locations, thereby detecting any discrepancies or defects in the actual image of the object pattern compared to the reference image of the same, according to Die-To-DataBASE protocol (detection test of defects in the actual pattern).

In the actual image pattern, defects such as rounding of corners, dimensional defects such as line width variations are sometimes created due to the effects of optical conditions and manufacturing processes, so that the reference images obtained from design data do not match precisely with the actual image. Such pseudo-discrepancies are difficult to detect in the conventional inspection method and apparatus.

Therefore, an approach may be considered to examine the features in various inspection locations of the object pattern, so that the reference image can be corrected beforehand in appropriate ways to recognize corners or to properly detect edge positions.

In the conventional method of corner rounding, a corner shape in a reference image is corrected using a corner inspection process suitable to the actual image, leading to correcting the design data without changing their binary format and bit (pixel) units.

In this case, corner shape modifications in the reference image are performed by first making a modified bit pattern based on the design bit pattern, and then performing logic computations using the binary bit data of the real image of the object pattern to carry out corrections for the corner shape in the reference image.

In the meantime, by examining the corner shapes and detecting edge positions in the actual image, correction templates in bit-units are prepared so as to match specific corner angles (for example, 0, 45, 90, 135 degrees) of the corners which are found in the design data.

From these corner templates, those which are closest to the corner shapes in the actual image are selected, and the original design data are corrected using the selected corner templates, and the modified design data are again processed to produce a final multi-valued image in 4–16 tonal gradations. The final reference image so produced are compared with the real image so that the differences in the tonal gradations in the final reference image and the actual image can be determined using a suitable threshold value of defect detection algorithm, to determine whether the discrepancies are functional defects. This type of inspection approach is outlined in Japanese Patent Applications, First Publications, Hei 4-350776 and Hei 6-273915.

A problem inherent in the conventional method of pattern inspection is that the productivity is low. A reference image is produced first from the original design data, and using the templates to approximate the corners in the real image, the original design data are correct to produce another reference image. Although the final reference image closely duplicates the actual image produced by optical scanning, the overall process is cumbersome and suffers from low productivity. It also presents a problem of creating pseudo-defects during the processing, caused by the difference in the tone gradations between correction templates and the actual image. This will be explained in more detail.

Correction templates for the design data are selected from many templates for matching of pattern shapes by selecting individual bit string patterns representing templates that are most similar to the string patterns in the actual image. Such computed bit strings are convoluted with point spread functions computed from the light intensity values obtained by optical scanning and the corrected template images to produce the final multi-valued reference image for comparison purposes. This process becomes highly computation-intensive when the number of pixels increase in an image, and consequently inspection productivity suffers.

Another problem is that, because corner identify and gradation rounding adjustment processes are carried out separately for one expanded reference data, computation requirements are further increased.

To counter such problems of productivity, processing speed may be shortened by including corner information in the pre-expansion design information, but this method suffers from an enormous amount of design information, which leads to increase in memory resources and expansion time. The result is that the overall productivity of inspection is lowered.

Further, because the corner rounding step in the pattern correction process is carried out at each pixel location according to a bit string of a given template, the existing method suffers from a drawback that the gradation values of the corrected pattern are limited by the gradation distribution available in the template.

Further, gradation correction is carried out without regard to the shapes of surrounding patterns, edge sections in a pattern that do not coincide with pixel locations and rounded sections extending from an edge to a corner are problematic, because the differences in gradation, between the reference image and the actual image obtained by scanning, become large, making such areas vulnerable to be identified as pseudo-defects.

For these reasons, if a design pattern contains a corner section, produced by two slanting edges intersecting at some angle, that is not at a pixel boundary, correction of gradation difference by template at the pixel level does not allow interpolation of gradation between the pixels.

Especially, those defects in the object pattern, existing in a pixel boundary or in corners that are smaller than the resolution capability of the inspection apparatus and are poor in contrast relative to the surrounding, are difficult to detect by comparing such patterns with the reference image, because they exhibit inferior difference in gradation relative to the surrounding.

SUMMARY OF THE INVENTION

It is an object of the present invention to provide a pattern inspection apparatus to generate a reference image having corner sections closely matching those in the real image of an object pattern, and to significantly reduce the chances of finding pseudodefects in the corner sections.

The object has been achieved in a method for a multi-level corner rounding process: where reference data are generated by expanding the design data so as to produce multi-level gradation reference data at each pixel having a resolution capability that is finer than an inspection resolution capability; the corner sections are automatically identified in the reference data that do not contain any corner information; and a corner rounding operation is performed on a corner section in a multi-level gradation state, in accordance with a corner radius extracted from the real image at a resolution finer than the inspection resolution capability.

The method may also include a step in which a corner section in the reference data is corrected to approximate a shape of a corner section in the real image, by scanning over the multi-level reference data about an object pixel, with a circular masking, or a ring shaped masking or a polygonal masking approximating a circle, having a radius given in pixel units or sub-pixel units, so as to define a neighboring pixel range of the object pixel.

The method may also include a step in which a corner pattern identification reference value for a masking pattern is derived according to a computational process comprising the steps of: defining a reference value for inside-masking total gradation derived by multiplying a maximum gradation value achievable in an object pattern in the reference data with a masking area ratio, which is a ratio of two areas, a unit area of a unit pixel and an area occupied in the unit pixel by a circular masking, or a ring-shaped masking or a polygonal masking defined in sub-pixel units, to be scanned into the reference data, and summing all products; designating one masking region that does not contain a center pixel produced by dividing the masking pattern along any line in the masking pattern, and similarly designating other masking region that contains the center pixel in the masking pattern; and assigning a masking curvature range lower limit value to the reference value of the inside-masking total gradation in the one masking region, while assigning a masking curvature range upper limit value to the reference value of the inside-masking total gradation in the other masking region.

The method may also include step in which a 1-pixel gradation ratio is derived by dividing the maximum gradation value by a difference between a masking curvature range upper limit and a masking curvature range lower limit.

The method may also include a step in which a gradation correction process for the object pattern comprises the steps of: obtaining an inside-masking total gradation value by multiplying a masking area ratio, which is a ratio of two areas, a unit area of a unit pixel and an area occupied in the unit pixel by a circular masking, a ring masking or a polygonal masking defined in sub-pixel units, to be scanned into reference data, with gradation values contained in the reference data at corresponding individual pixels inside the masking pattern, and summing all products; assigning a minimum gradation value as a gradation value of a center pixel address in the masking pattern, when an insidemasking total gradation value is less than a masking curvature range lower limit value; assigning a maximum gradation value as a gradation value of a center pixel address in the masking pattern, when an inside-masking total gradation value is greater than a masking curvature range upper limit value; assigning to a center pixel address in the masking pattern, a gradation value obtained by subtracting a masking curvature range lower limit value from an inside-masking total gradation value, and multiplying a difference with a 1-pixel gradation ratio, when the inside-masking total gradation value is greater than the masking curvature range lower limit value but is less than the masking curvature range upper limit value; and repeating the gradation correction process for each pixel in the object pattern so as to modify gradation values only in sub-pixel units for corner sections.

The method may also include a step in which after completing rounding operations of corner sections, a comparison reference image is produced by applying a filtering process, suitable to optical properties of an inspection apparatus, to multi-level gradation reference data so as to produce the comparison reference image having gradations approximating gradations in corner sections in a corresponding real image.

The multi-level corner rounding methods presented above are practiced most preferably in a pattern inspection apparatus for scanning an object pattern, generated according to design data, with a laser beam of a specific wavelength; focusing transmitted light on photodetector means through an objective lens so as to generate a real image from pattern information obtained from the photodetector means; comparing the real image with a reference image derived from the design data; and detecting defects in the object pattern.

As explained above, in the present method, design data whose gradation values at each pixel are prepared as a matrix of high resolution multi-level gradations are corrected while maintaining the multi-level gradations. Therefore, even when the corner and edge sections of the design data are located inside a pixel, not at a pixel boundary, gradations in the corner sections in the object pattern can be expressed with a high degree of precision, thereby producing a reference image that closely matches the real image obtained from the object pattern.

Also, gradations in the multi-level expanded reference data are corrected using a suitable masking pattern based on a total value of the neighboring gradations of a target pixel located inside the masking pattern. Therefore, when matching the corner shape with a template, corrected gradations are not limited by the gradations available in the template as in the conventional method, thereby enabling to produce a reference image closely matching the gradations in the real image. Also, a masking pattern can be chosen in pixel units or sub-pixel units according to the radius of curvature of the corner sections in the real image, therefore, corner section gradations in the design data can be corrected to suit the degree of precision required in individual inspection.

Also, in the present method, not only the shape of a making pattern but the 1-pixel gradation ratio can be adjusted by varying the masking curvature range, therefore, the present method enables to process those gradations that can not be corrected by shape correction alone. An additional advantage is that corner recognition and rounding operations can be performed concurrently in one scanning operation of the masking pattern into the reference data, thereby significantly increasing the inspection productivity.

Further, regardless of the orientation of the corner section of a given angle in a wiring pattern described in the design data, only the pixel corresponding to the relevant corner can be identified and multi-level gradation correction can be performed based on sub-pixel units which offer finer resolution than the pixel resolution. Therefore, the method is able to significantly control distortion in the object pattern produced by the rounding process, thereby enabling to produce a reference image closely matching the real image, even when the scanning direction does not coincide with the order of arrangement of the design data.

BRIEF DESCRIPTION OF THE DRAWINGS

FIG. 4 is a tabular matrix to explain the gradation values of each pixel shown in FIG. 2.

FIG. 5 is a diagram for a four-neighbor masking pattern defined in pixel units.

FIG. 6 is a diagram for a circular masking pattern (radius= 2.5 pixels) defined in pixel units.

FIG. 7 is a diagram showing polygonal masking patterns (true circle) with various radii defined in sub-pixel units.

FIG. 15 is a tabular matrix to show a distribution of actual gradation values in a corner section in an actual image obtained by laser scanning.

FIG. 16 is a tabular matrix to show the results of performing a blending (gradation) operation after a corner rounding operation.

FIG. 17 is a tabular matrix to show a distribution of gradation values in a difference image between the actual image and the reference image.

FIG. 18 is a table to show the numerical data of masking curvature upper limit, lower limit and 1-pixel gradation ratio for the masking patterns used in the present invention.

DESCRIPTION OF THE PREFERRED EMBODIMENTS

Preferred embodiments will be presented with reference to the drawings.

Figure 1:
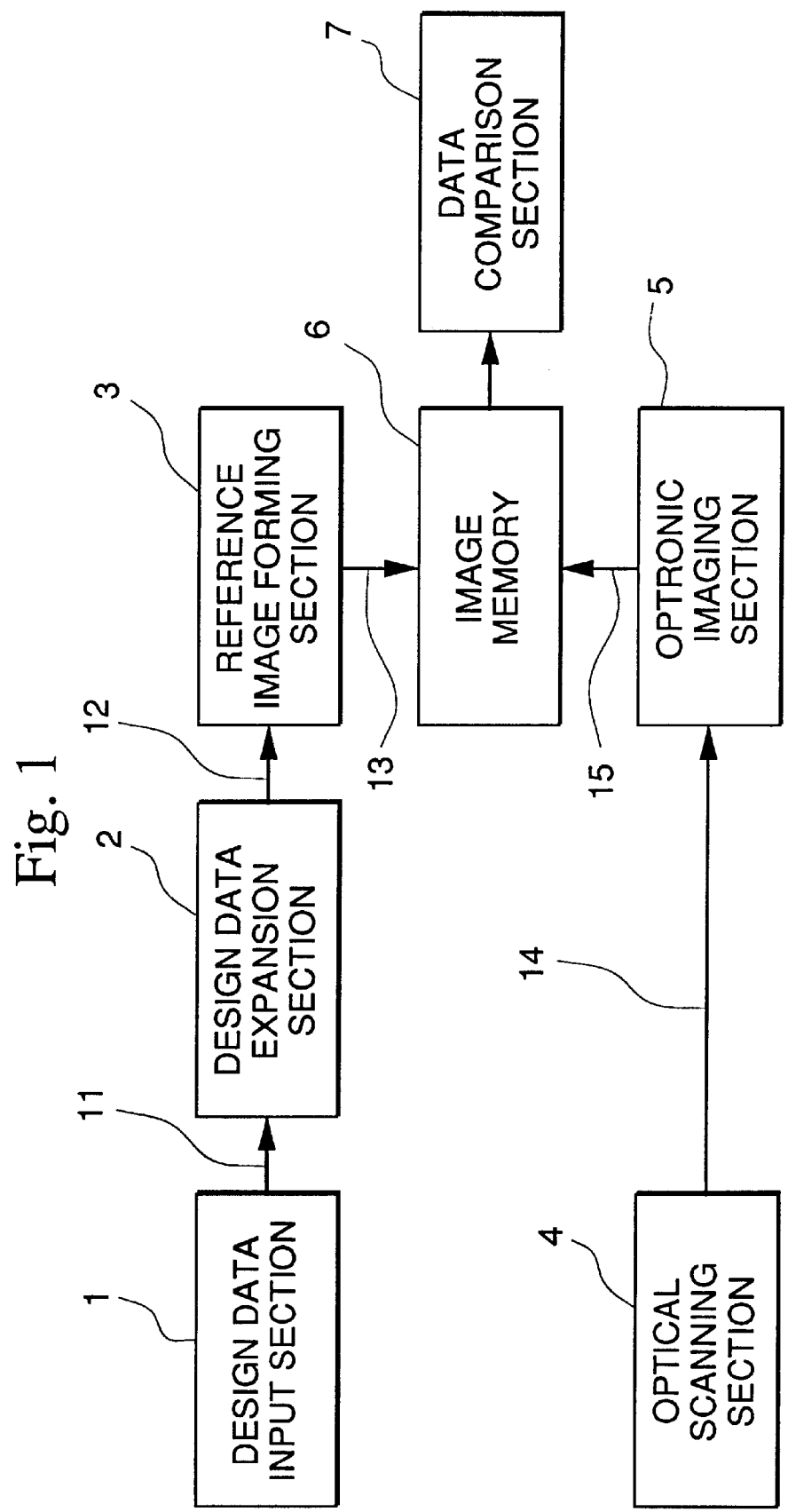
FIG. 1 is a block diagram of a first embodiment of the pattern inspection apparatus of the present invention.

FIG. 1 is a block diagram of a first embodiment of the pattern inspection apparatus.

The pattern inspection apparatus includes an optical scanning section 4 for scanning a wiring pattern (object pattern) to be inspected by a laser beam and outputting scan signals 14, and an optronic imaging section 5 for converting the scan signals 14 to an actual image 15 having multi-valued gradations.

The apparatus also includes: a design data input section 1 for inputting design data 11 to define the shape and sizes of an object pattern to be inspected; a design data expansion section 2 for expanding the design data 11 into a wiring pattern to produce multi-level gradation reference data 12; a reference image forming section 3 for producing a reference image 13 by correcting individual wiring patterns in the reference data 12 so as to match the actual image 15; and a data comparison section 7 to perform inspection of the object pattern by comparing the actual image 15 produced by optical scanning with the reference image 13 produced from the design data 11.

The operation of the inspection apparatus will be explained with reference to the drawings.

Design data 11 described in a format such as MEBES are input from the design data input section 1.

Next, input design data 11 are expanded in the design data expansion section 2, as a wiring pattern at individual pixels arranged in a lattice configuration to correspond to the coordinate addresses in the actual image 15.

Figure 2:
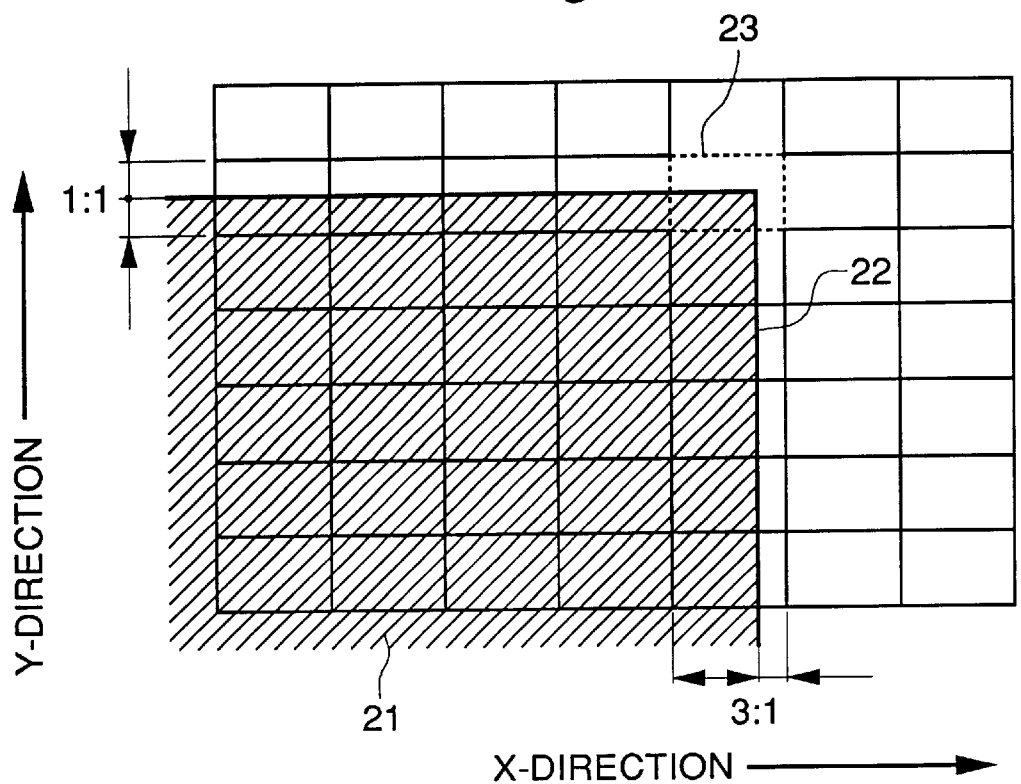
FIG. 2 is an illustration of a part of an expanded pattern of a wiring corner.

FIG. 2 shows a portion of an expanded wiring pattern. Pixels are represented by each rectangle, and correspond to the expansion resolution capability of the design data expansion section 2. The edge 22 of a pattern 21 is not located at a pixel boundary, and indicates that, in a pixel 23, the pattern 21 occupies the pixel area in a ratio of 3:1 in x-direction (horizontal), and in a ratio of 1:1 in y-direction (vertical).

Each pixel is provided with a plurality of sub-pixels for computing the values for multi-valued gradation (gray scale) at a finer resolution level than that given by the inspection resolution capability, so that the precision of the gradation levels is determined by the number of sub-pixels provided in each pixel.

For example, if the data are to be expanded in a gradation range of a maximum value 255 and a minimum value 0, each pixel is comprised by 16×16 sub-pixels, where each sub-pixel represents a binary bit and can have a value of either [0] or [1].

Figure 3:
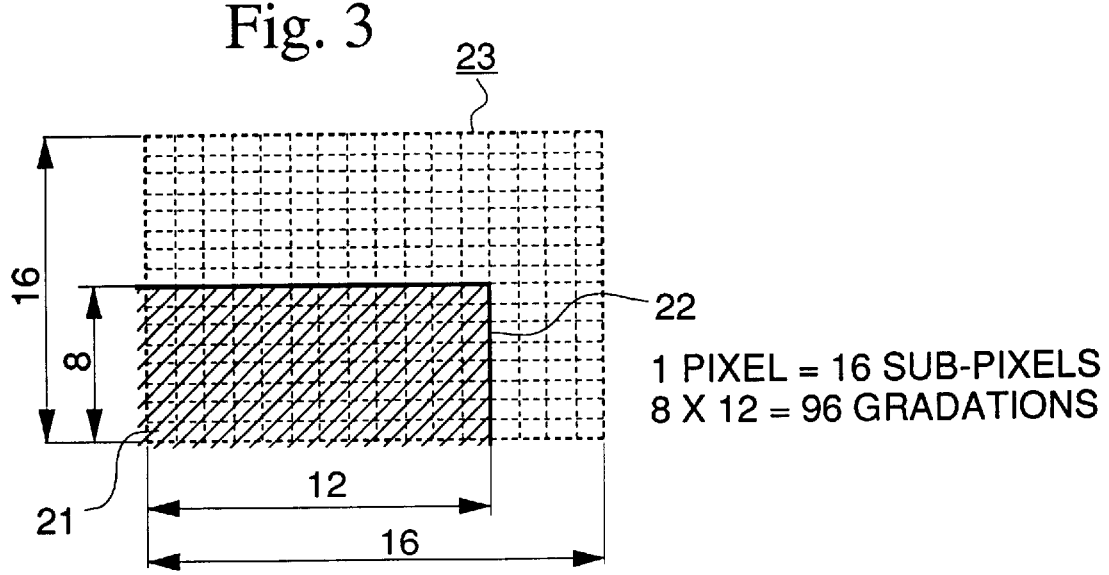
FIG. 3 is an enlarged view of one pixel shown in FIG. 2.

FIG. 3 is an enlarged view of the pixel 23 shown in FIG. 2. It can be seen that the pattern 21 occupies 8×12 sub-pixels among the total number of sub-pixels 16×16 available in one pixel.

In this case, if the sub-pixels inside the pattern 21 are designated by [1] and subpixels outside the pattern 21 are designated by [0], the gradation value for pixel 23 is 8×12=96.

Accordingly, the minimum gradation value is MIN=0 for the pixels not inside the pattern 21 while, excepting for the edges of the pattern, the maximum gradation value is MAX=255 for the pixels inside the pattern 21.

Therefore, it can be seen that the gradation value of the pixels for the edge portion which occupies partial pixels in the pattern 21 is given by the number of subpixels in the individual pixels that are inside the pattern 21.

As shown in FIG. 4, by integrating the area of bit strings within a given pixel, gradation values of the expanded pattern 21 can be computed at each pixel representing an address of each coordinate point in the actual image 15.

Therefore, in the design data expansion section 2, after developing the wiring pattern on each pixel according to the design data 11, gradation values are computed for each pixel and the results are output as reference data 12.

Next, the reference image forming section 3 corrects for edge positions in the wiring pattern by enlarging or reducing the line width of the edge data included in the reference data 12, output from the design data expansion section 2, and appropriately moves the edge position on the basis of pixel units or sub-pixel units.

At this point, a corner section in the reference data 12 and a corresponding corner section in the actual image 15 are compared, and the corner section in the reference data 12 is corrected to produce a multi-valued rounded corner based on the radius of the corner section in the actual image 15.

Subsequently, by executing a filtering operation suitable to the optical properties of the inspection system, a reference image 13 to approximate the actual image 15 is produced.

In the process of multi-level rounding correction, correction parameters, which are radius size for rounding and the number of times the rounding process to be repeated are determined as follows. A representative actual image 15 is selected from the many actual images 15 stored in the image memory 6 (see FIG. 1), and using an image of the target corner section, the shape and gradation distributions in the actual image 15 are examined in relation to the corresponding corner section in the object pattern in the reference data 12. The correction parameters are then determined according to the minimum value of the sum of the differences in the brightness between the actual image 15 and the reference image 13, produced by modifying the reference data 12 at the corresponding corner using various shapes of masking patterns to closely match the corner characteristics in the actual image 15. Detailed steps will be explained in the following.

First, a method for computing the curvature range lower limit (the lower limit in the range of the point of the reverse curve), the curvature range upper limit (the upper limit in the range of the point of the reverse curve) and the 1-pixel gradation ratio for a masking shape will be explained.

FIGS. 5 to 10 show various examples of masking patterns, where FIG. 5 is an example of a four neighbor masking pattern defined in pixel units, FIG. 6 is an example of a round masking pattern defined in pixel units (radius R=2.5 pixels).

Figure 8:
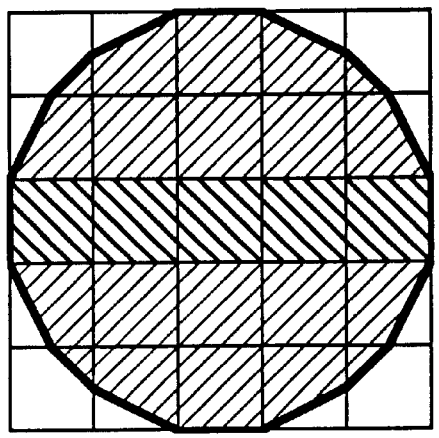
FIG. 8 is a diagram for a polygonal masking pattern shown in FIG. 7, where the radius corresponds to 2.5 pixels.
Figure 9:
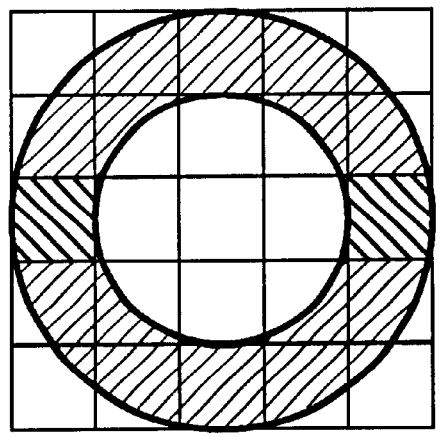
FIG. 9 is a diagram for a ring masking pattern defined in sub-pixel units.
Figure 10:
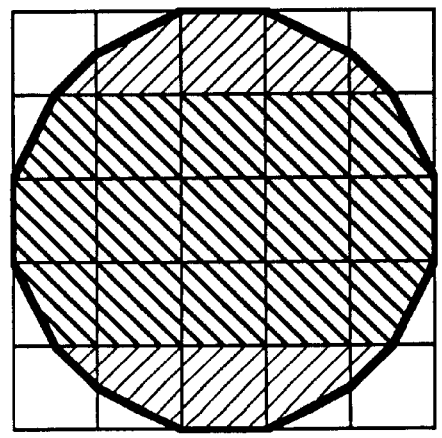
FIG. 10 is a diagram for a circular masking pattern (radius=2.5 pixels) in which the range of curvatures has been expanded.

FIG. 7 shows various examples of a polygonal pattern (true circle) having various radii defined in sub-pixel units, FIG. 8 is a polygonal pattern to approximate the true circle having a radius of R=2.5 pixels shown in FIG. 7, FIG. 9 is an example of a ring pattern defined in sub-pixel units, and FIG. 10 is an example of a polygonal pattern approximating the true circle (R=2.5 pixels) where the curvature range is extended.

In the following explanation, to facilitate the explanation of the shape correction process, the unit pixel pattern shown in FIG. 6 will be used and the processing steps will be discussed with reference to FIG. 11.

In FIG. 6, each grid represents a unit pixel, and the gradations can be provided from the minimum value MIN=0 to the maximum value MAX=255 at each grid inside the masking pattern.

Representative masking pattern edges in the reference data 12 to be scanned are chosen such that they are not blended and their gradation values are all at MAX.

A value for the curvature range lower limit is computed using the relation (1) shown below, and the computation process will be explained with reference to FIG. 11.

Figure 11A:
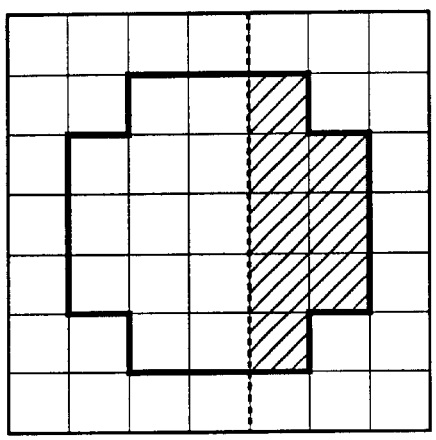
FIGS. 11A~11E are illustrations to explain how masking curvature range and 1 pixel gradation ratio are generated.
Figure 11B:
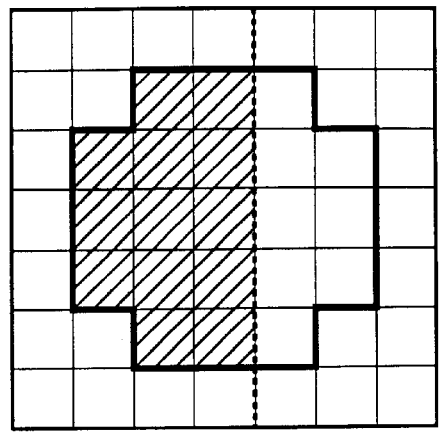
Figure 11C:
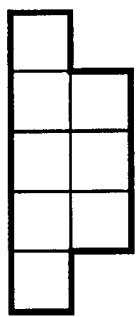

Consider folding a masking pattern into two sections, S1 and S2, as shown in FIGS. 11A and 11B about a center line (dotted line). S1 represents a region of the masking pattern that does not include the pixel array having the center pixel, and S2 represents a region of the masking pattern that includes the pixel array having the center pixel. Individual sections S1, S2 are extracted and shown in FIG. 11C and FIG. 11D, respectively. Then the lower limit for the curvature range is given by relation (1).

Masking curvature range lower limit value=$S1 \times MAX$ (1)

For the masking region S1 (FIG. 11C), which does not contain the pixel array having the center pixel, the lower limit is $MAX \times 8$. The lower limit represents the highest number of gradations that can be exhibited inside a masking region that does not include the pixel array having the center pixel.

Similarly, the curvature range upper limit is computed, according to the relation (2) shown below.

Curvature range upper limit value=$S2 \times MAX$ (2)

Figure 11D:
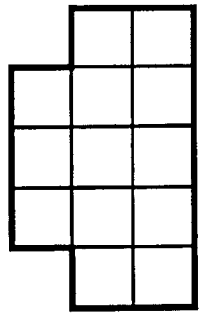

For the masking region S2 that contains the pixel array having the center pixel (FIG. 11B), the upper limit of curvature range is $MAX \times 13$, as shown in FIG. 11D. The upper limit represents the highest number of gradations achievable inside the masking region that includes the pixel array having the center pixel.

A 1-pixel gradation ratio of the masking curvature range is computed according to relation (3), and is explained with reference to FIG. 11E, which shows a process of pixel subtraction of the lower limit value from the maximum limit value of the masking curvature range. The 1-pixel gradation ratio is obtained by dividing the maximum gradation value (MAX) with the result of pixel subtraction.

Figure 11E:
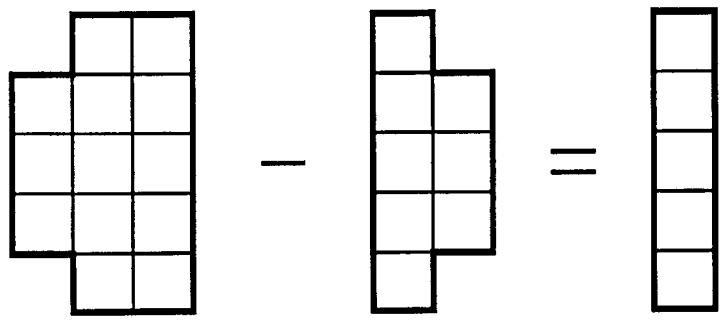

That is, the 1-pixel gradation ratio is give by:

maximum gradation value/(upper limit value−lower limit value of the curvature ranges)=$MAX/(S2 \times MAX - S1 \times MAX) = MAX/(S2-S1)$, (3)

therefore, in the case illustrated in FIG. 11E:

=$MAX/(13 \times MAX - 8 \times MAX) = 1/(13-8) = 1/5$.

FIG. 18 summarizes the results of computation of the upper and lower limit values of the masking curvature range, and the 1-pixel gradation ratio of the masking curvature range for the respective masking patterns shown in FIGS. 5~10 inclusively.

Next, the multi-level rounding process will be explained with reference to FIG. 12, which is a flowchart of the computational process.

In the following description, it is assumed that the actual image 15 has been compared with the reference data 12, and the edge positions in the reference image 13 have already been corrected by applying multi-level expansion or reduction processes in sub-pixel units. Therefore, the following presentation relates only to the process of corner shape correction in the reference image 13.

First, for speeding up the correction process, the upper and lower limit values of the masking curvature range, the 1-pixel gradation ratio and the number of repetition of rounding process are pre-calculated using the shape of the actual masking pattern, and the results are stored in the memory in the reference image forming section 3 (step 51).

Next, if the rounding process has not been carried out to the required number of repetition (NO in step 52), the selected masking pattern is scanned over in the reference data 12.

If the repetition step has not been completed for all the pixels (NO in step 53), a value for the inside-masking total gradation is obtained (step 54), and depending on the value of the inside-masking total gradation so found, one of the following three steps is carried out to correct the gradation of the object pixel (step 55).

If, the inside-masking total gradation value≧curvature range upper limit value, the object pixel is corrected to the maximum gradation value MAX=255 (step 58).

If the inside-masking total gradation value≦curvature range lower limit value, the object pixel is corrected to the minimum gradation value MIN=0 (step 57).

If the curvature range lower limit value<inside-masking total gradation value<curvature range upper limit, the object pixel is corrected according to a reference value obtained from the following relation (4), (step 56).

Correction value for object pixel=(inside-masking total gradation value−curvature range lower limit value)×(1-pixel gradation ratio) (4)

Figure 12:
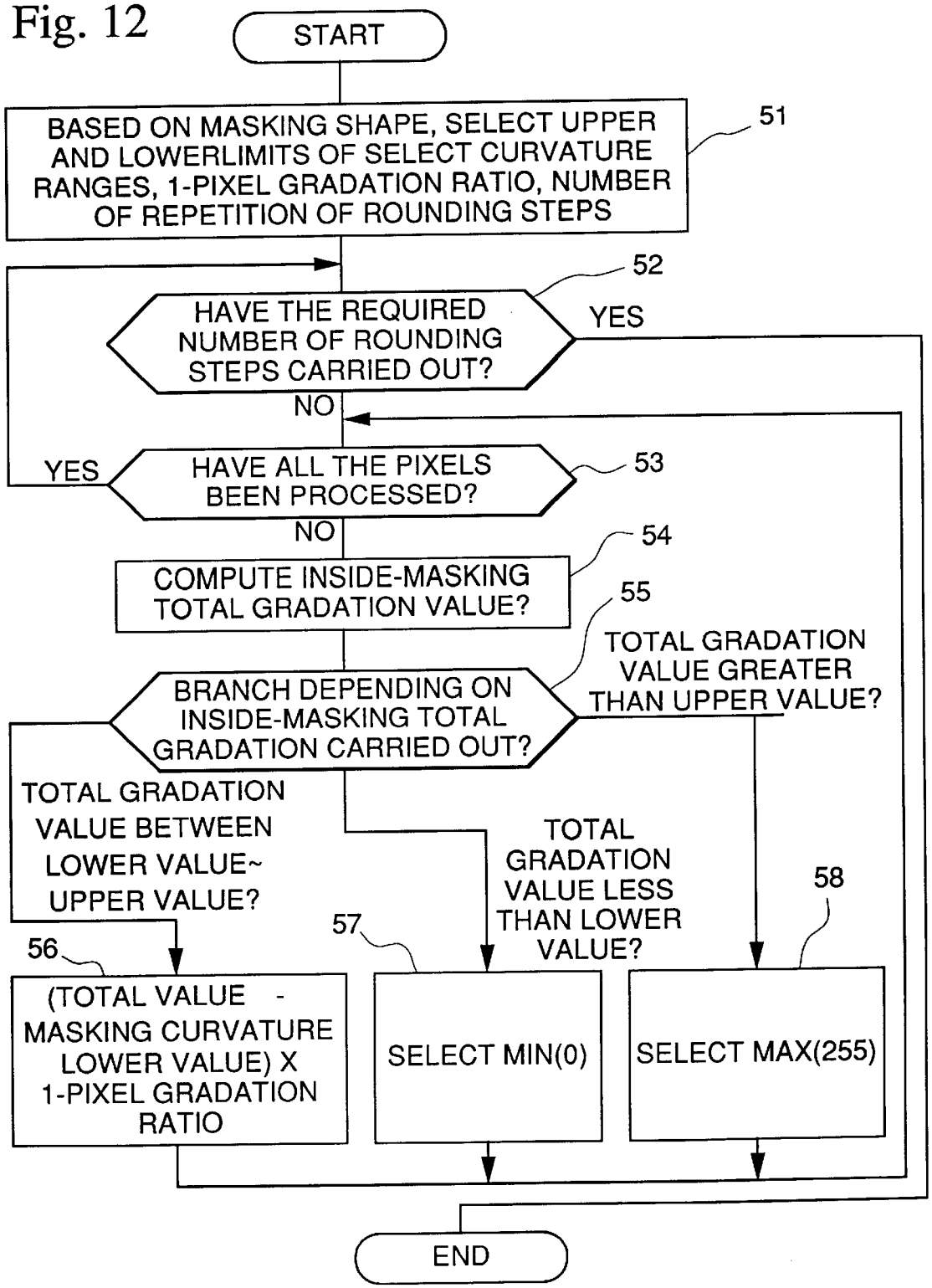
FIG. 12 is a flowchart for a multi-level rounding process.

FIG. 13 shows an example of performing the rounding correction steps shown in FIG. 12 on a circular masking pattern shown in FIG. 6.

To facilitate the explanation, it is assumed that the reference data always coincide with the pixel boundary, and the peripheral sections of the object pattern are at the maximum gradation value=255.

Figure 13A:
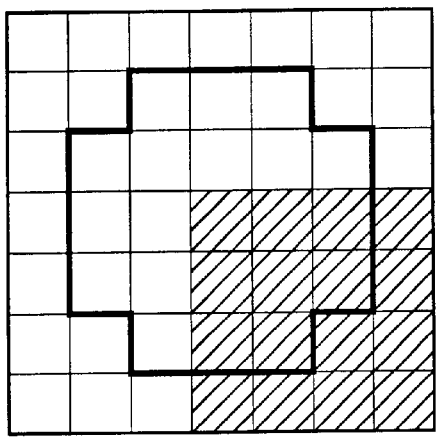
FIGS. 13A~13D are illustrations to explain how to determine the gradation values in the corner rounding process based on pixel units.

When a masking pattern is scanned over the multi-level expanded reference data 12, and if the scanning position is at a spot shown in FIG. 13A, inside-masking total gradation value=8×MAX, and since this value for this pattern is equal to the curvature range lower limit value (8×MAX) listed in FIG. 18, this spot is assigned a value 0. In other words, this spot is judged to be a black pixel whole region.

Figure 13B:
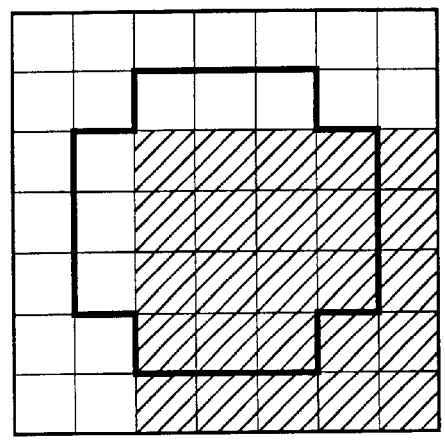

When the scanning position is at a spot shown in FIG. 13B, inside-masking total gradation value=15×MAX, and is higher than the curvature range upper limit value (13×MAX) shown in FIG. 18, therefore, this spot is assigned a value 255. In other words, this spot is judged to be a white pixel whole region.

Figure 13C:
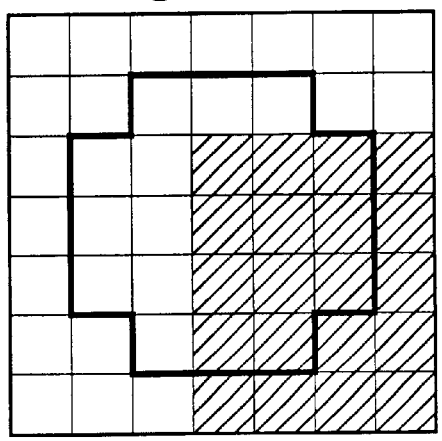

In the case of FIG. 13C, inside-masking total gradation value (11×MAX) is between the upper and lower values of the curvature ranges, and satisfies the condition: curvature range lower limit value<inside-masking total gradation value <curvature range upper limit, and therefore, corrected gradation value=(11×MAX−8×MAX)×(1/5)=153.

Figure 13D:
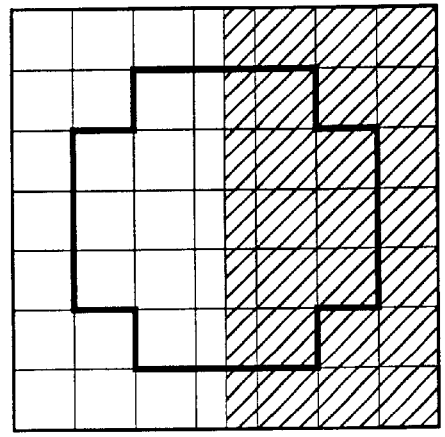

In the case of FIG. 13D, although inside-masking total gradation value is within the curvature range, the corrected value of the object pixel always matches with the gradation value of the center pixel of the masking when the masking pattern scanned over the reference data.

In other words, when the center of the masking pattern is on an edge of the object pattern, no gradation correction is performed on the reference data 12.

Therefore, only the gradations in the corner section are corrected, so that corner recognition step and corner rounding step are executed concurrently.

By following such a procedure, when mask scanning has been repeated for all the pixels (YES in step 53), and when the gradation correction process has been carried out for the specified number of repetitions for all the pixels (YES in step 52), the entire correction process is completed.

FIGS. 14B to 14F show gradation changes obtained in the reference data 12 by applying the masking patterns respectively shown in FIG. 6, each of the patterns in FIG. 7 for R=1.5, R=2.0 and R=2.5, and the pattern in FIG. 9. These results relate to the particular cases of edges and corners not being coincident with the pixel boundary, and the contour lines indicate gradation values at a given pixel position.

Figure 14A:
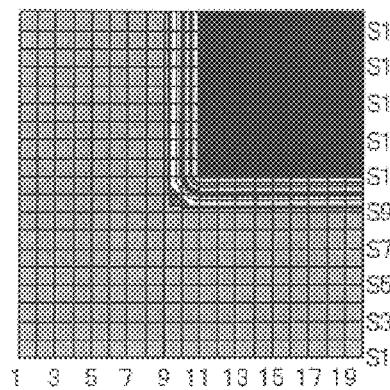
FIGS. 14A~14F are illustrations of reference images after performing rounding processes using various masking shapes on a corner section of reference data.
Figure 14D:
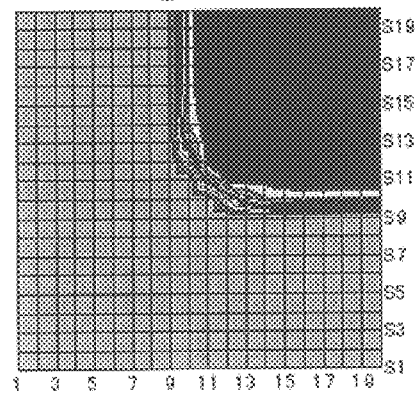
Figure 14B:
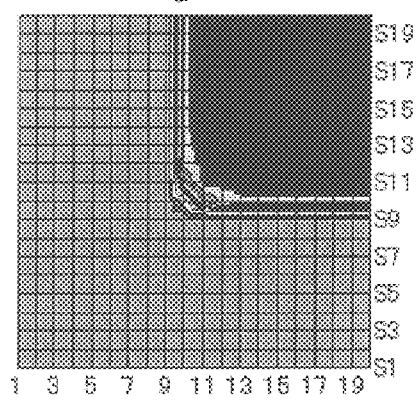
Figure 14E:
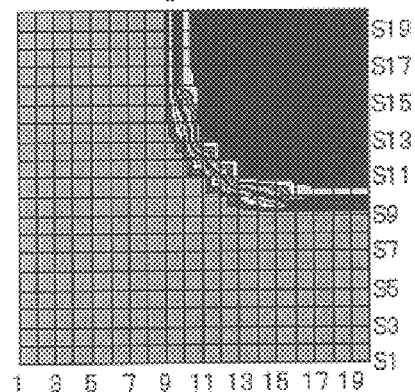
Figure 14C:
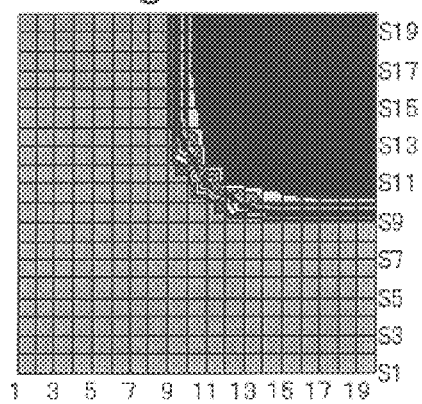
Figure 14F:
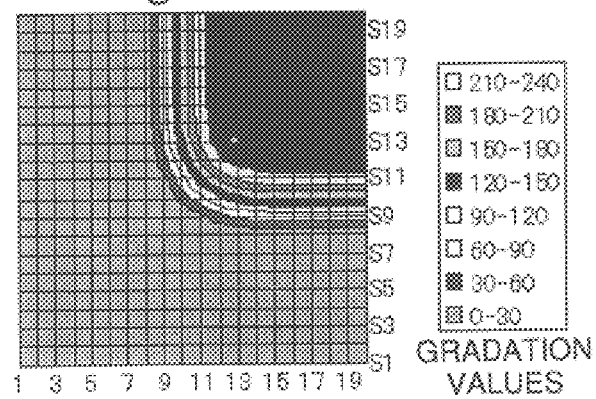

FIG. 14A shows an as-expanded reference image produced from the reference data 12, and FIGS. 14B to 14F show the results of applying each of the masking patterns shown in FIG. 6, FIG. 7 and FIG. 9 to perform multi-level rounding process to the as-expanded reference image.

These results show that when masking is applied to the as-expanded reference data, the corners sections are corrected to a shape to correspond with the various masking shapes applied.

All the images shown in FIGS. 14A to 14F are produced from the digital patterns recorded in reference data 12 by converting the multi-level gradation digital data to respective images.

FIG. 15 shows the gradation values in a corner section in the actual image 15, and FIG. 16 shows the gradation values in a reference image 13 at the same corner after applying two stages of corrections to the actual image 15. First, the reference data 12 were corrected by the multi-level rounding correction process, shown by the flowchart in FIG. 12, using the masking pattern approximating the true circle (R=2.5) shown in FIG. 8. The corrected results of rounding were then further subjected to a blending (gradation) process using the filtering coefficients of optical point spread function obtained from the actual image 15.

FIG. 17 shows gradation values in the various locations of a difference image between the reference image 13 and the actual image 15.

It can be seen that, judging from the fact that gradation differences are quite small, even if the corner and edge sections do not coincide with the pixel boundaries, rounding correction at the sub-pixel level can produce gradation values in the reference image 13 that are very close to those in the corner section in the real image 15.

Accordingly, the reference image forming section 3 (see FIG. 1) produces a reference image 13, from the reference data 12 input thereto, by applying the multi-level rounding correction process at a pixel-unit level or a sub-pixel unit level, that is very close to the real image 15.

Next, the reference image 13 is stored in the image memory 6, and is compared with the actual image 15 which has already been stored, and the images are compared in the image comparison section 7 whether the object pattern for inspection is drawn accurately based on the ideal pattern produced from the respective design data including shape and size of the circuit.

It should be noted that, in the descriptions given above, integers were used in the computation process for protecting the processing speed, but if there is no time restriction, floating decimal values can be used in the computing the values of upper and lower limits of curvature range, the 1-pixel gradation ratio and inside-masking total gradation.

By adopting such a procedure, instead of using an approximated true circle, a true circle masking pattern can be used directly to increase the precision of pattern inspection even more.

What is claimed is:

1. A method for a multi-level corner rounding process for digital rounding of corner sections in reference data for an object pattern according to design data, comprising:

scanning said object pattern with a laser beam of a specific wavelength;

focusing transmitted light through said object pattern on photodetector means using an objective lens so as to produce a real image of said object pattern according to object pattern information obtained by said photodetector means;

comparing said real image with a reference image generated from said design data; and thereby detecting defects in said object pattern, wherein said reference data are generated by expanding said design data so as to produce multi-level gradation reference data at each pixel having a resolution that is finer than an inspection resolution capability; said corner sections are automatically identified in said reference data; and a corner rounding operation is performed on a corner section in a multi-level gradation state, in accordance with a corner radius extracted from said real image at a resolution finer than said inspection resolution capability.

2. A method according to claim 1, wherein a corner section in the reference data is corrected to approximate a shape of a corner section in said real image, by scanning over said multi-level reference data about an object pixel, with a circular masking, or a ring shaped masking or a polygonal masking approximating a circle, having a radius given in pixel units or sub-pixel units, so as to define a neighboring pixel range of said object pixel.

3. A method according to claim 2, wherein a corner pattern identification reference value for a masking pattern is derived according to a computational process comprising:

defining a reference value for inside-masking total gradation derived by multiplying a maximum gradation value achievable in an object pattern in said reference data with a masking area ratio, which is a ratio of two areas, a unit area of a unit pixel and an area occupied in the unit pixel by a circular masking, or a ring-shaped masking or a polygonal masking defined in sub-pixel units, to be scanned into said reference data, and summing all products;

designating one masking region that does not contain a center pixel produced by dividing said masking pattern along any line in said masking pattern, and similarly designating other masking region that contains said center pixel in said masking pattern; and assigning a masking curvature range lower limit value to said reference value of the inside-masking total gradation in said one masking region, while assigning a masking curvature range upper limit value to said reference value of the inside-masking total gradation in said other masking region.

4. A method according to claim 3, wherein a 1-pixel gradation ratio is derived by dividing said maximum gradation value by a difference between a masking curvature range upper limit and a masking curvature range lower limit.

5. A method according to claim 4, wherein a gradation correction process for said object pattern comprises:

obtaining an inside-masking total gradation value by multiplying a masking area ratio, which is a ratio of two areas, a unit area of a unit pixel and an area occupied in the unit pixel by a circular masking, a ring masking or a polygonal masking defined in sub-pixel units, to be scanned into reference data, with gradation values contained in said reference data at corresponding individual pixels inside said masking pattern, and summing all products;

assigning a minimum gradation value as a gradation value of a center pixel address in said masking pattern, when an inside-masking total gradation value is less than a masking curvature range lower limit value;

assigning a maximum gradation value as a gradation value of a center pixel address in said masking pattern, when an inside-masking total gradation value is greater than a masking curvature range upper limit value;

assigning to a center pixel address in said masking pattern, a gradation value obtained by subtracting a masking curvature range lower limit value from an inside-masking total gradation value, and multiplying a difference with a 1-pixel gradation ratio, when said inside-masking total gradation value is greater than said masking curvature range lower limit value but is less than said masking curvature range upper limit value; and repeating said gradation correction process for each pixel in said object pattern so as to modify gradation values only in sub-pixel units for corner sections.

6. A method according to claim 5, wherein after completing rounding operations of corner sections, a comparison reference image is produced by applying a filtering process, suitable to optical properties of an inspection apparatus, to multi-level gradation reference data so as to produce said comparison reference image having gradations approximating gradations in corner sections in a corresponding real image.

7. A pattern inspection apparatus for scanning an object pattern, generated according to design data, with a laser beam of a specific wavelength; focusing transmitted light on photodetector means through an objective lens so as to generate a real image from pattern information obtained from said photodetector means; comparing said real image with a reference image derived from said design data; and detecting defects in said object pattern according to a multi-level corner rounding method disclosed in one of claims 1 to 6.

* * * * *